J. H. GILMAN.
ELEVATOR.
APPLICATION FILED DEC. 17, 1914.
1,281,342.
Patented Oct. 15, 1918.
3 SHEETS—SHEET 1.
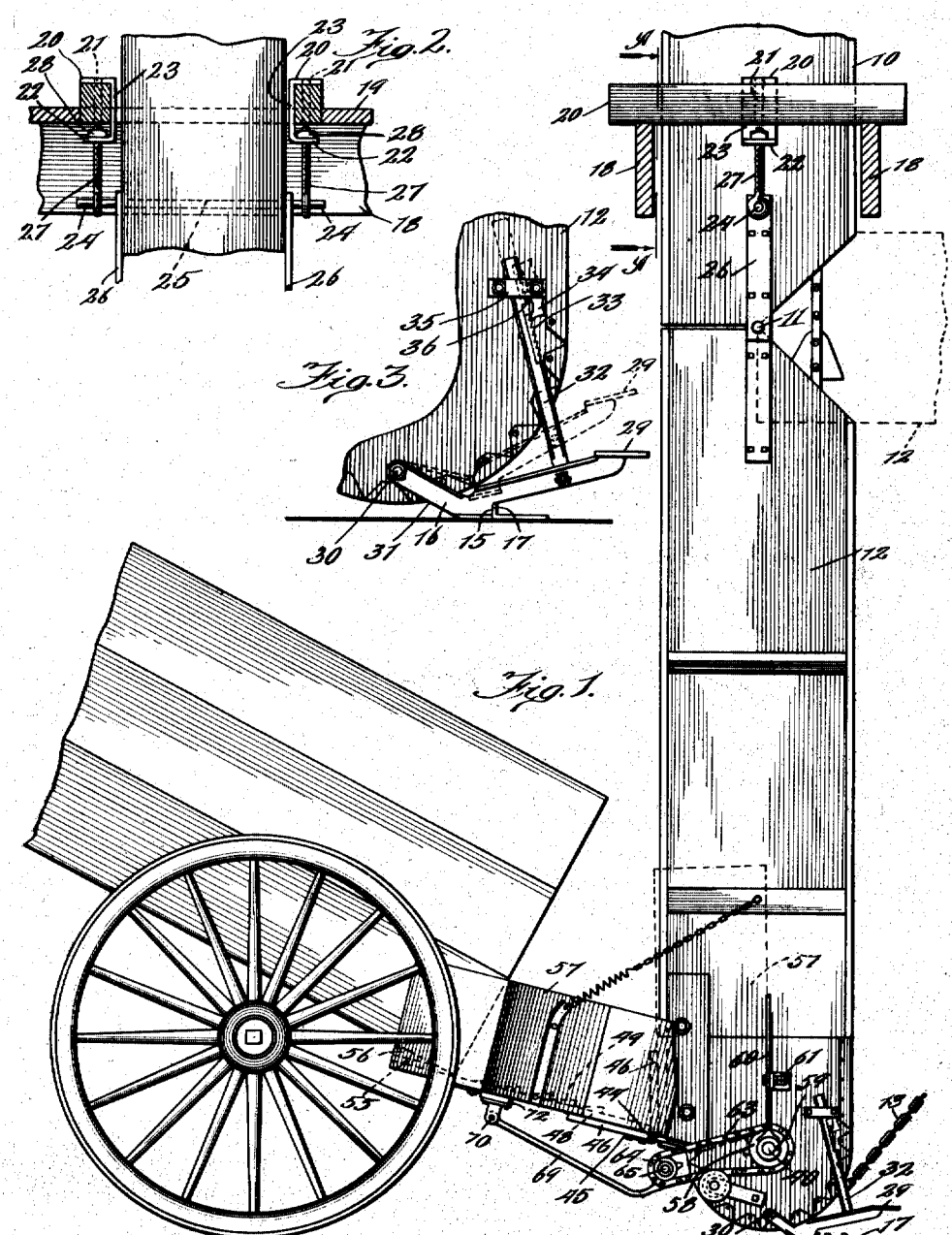

J. H. GILMAN.
ELEVATOR.
APPLICATION FILED DEC. 17, 1914.

1,281,342.

Patented Oct. 15, 1918.
3 SHEETS—SHEET 2.

Witnesses:
Inventor:
John H. Gilman
By John Howard McElroy
his Atty.

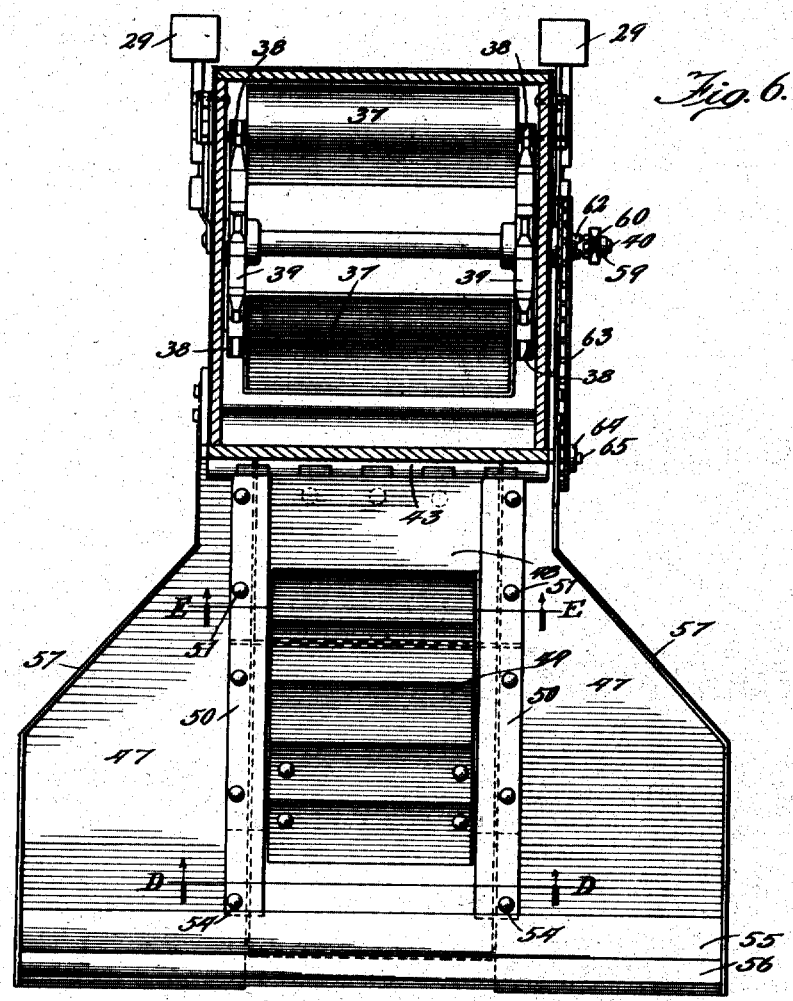
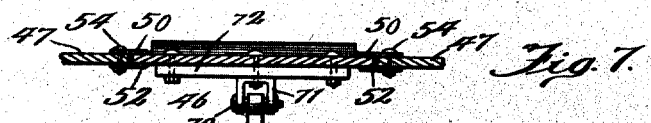

UNITED STATES PATENT OFFICE.

JOHN H. GILMAN, OF OTTAWA, ILLINOIS, ASSIGNOR TO KING & HAMILTON COMPANY, OF OTTAWA, ILLINOIS.

ELEVATOR.

1,281,342.   Specification of Letters Patent.   Patented Oct. 15, 1918.

Application filed December 17, 1914. Serial No. 877,646.

*To all whom it may concern:*

Be it known that I, JOHN H. GILMAN, a citizen of the United States, and a resident of Ottawa, in the county of La Salle and State of Illinois, have invented certain new and useful Improvements in Elevators, of which the following is a full, clear, and exact specification.

My invention is concerned with certain improvements upon elevators of the class shown in prior Patent No. 1,089,125, granted March 3, 1914, to myself and Albert E. Gilman, in which a portion of a vertical conveyer-trough and the included conveyer chains and cups can be folded up out of the way to allow a wagon to be driven beneath it and into dumping position.

My invention is concerned with an improvement whereby the feed of the grain from the hopper to the conveyer will be made positive, instead of depending upon the action of gravity, as has been the practice heretofore, in combination with a locking mechanism which serves to oppose and overcome the tendency of the suspended portion of the conveyer trough to swing under the thrust of the hopper feed mechanism.

To illustrate my invention, I annex hereto three sheets of drawings, in which the same reference characters are used to designate identical parts in all the figures, of which,—

Figure 1 is a side elevation of a portion of an elevator having my improvements applied thereto and showing the rear end of a wagon in dumping position:

Fig. 2 is a detail in section on the line A—A of Fig. 1;

Fig. 3 is a detail on an enlarged scale, showing the locking mechanism;

Fig. 6 is a top plan view of the same, as seen in section on the line C—C of Fig. 5; and Figs. 7 and 8 are details in section on the lines D—D and E—E of Fig. 6.

Figure 4:
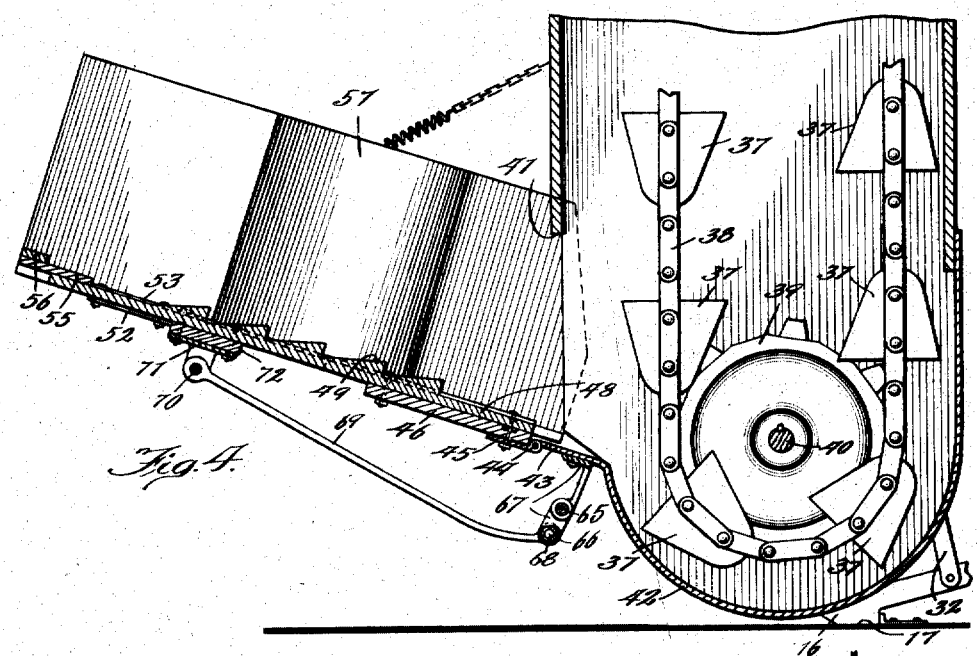
Fig. 4 is a detail on an enlarged scale, as seen in section on line B—B of Fig. 5.
Figure 5:
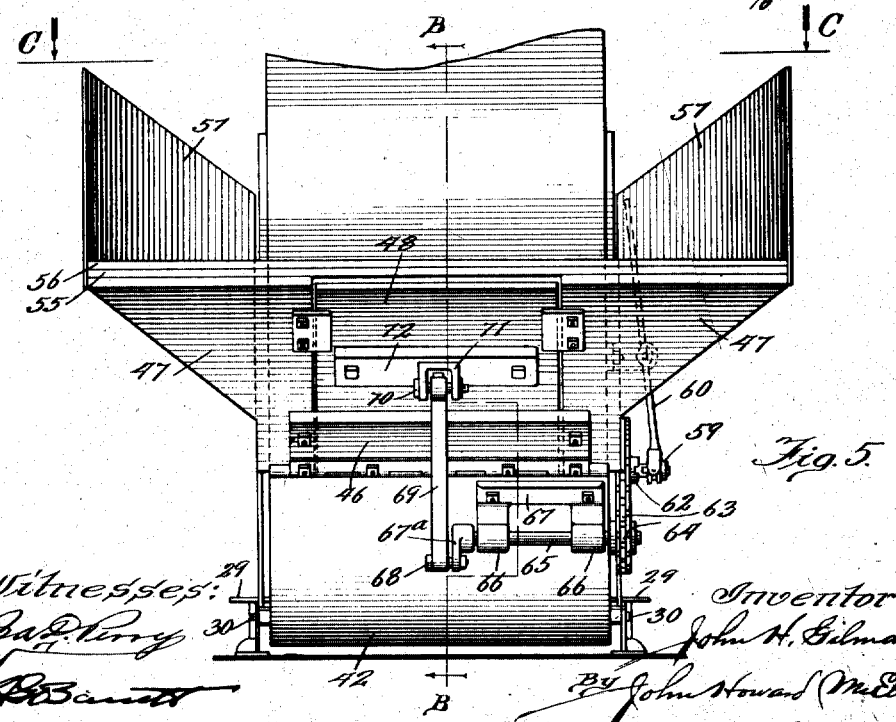
Fig. 5 is a view of the lower end of the elevator and of the hopper, as seen from the left-hand side of Fig. 1, but on an enlarged scale.

Elevators of the class shown in prior Patent No. 1,089,125 contain the vertical, stationary portion 10 of the conveyer trough or framework, to which is pivoted at 11 the lower portion 12 of the same framework, which is adapted to be pulled by the chain 13 from the vertical, operative position shown in full lines in Fig. 1, to the horizontal, inoperative position indicated in dotted lines, to permit a wagon to be driven beneath the elevator and into the dumping position indicated. When the wagon has been driven into dumping position, the lower section 12 of the framework or trough is swung down from its dotted-line to its full-line position, the hopper 14 having been previously swung out so that it will have its outer end extend beneath the tail end of the wagon as the elevator-section swings into place, where it is secured by the coöperation of the shoulders 15 on the locking lever 16, of which there is preferably one on each side, with the locking lugs or projections 17, which are secured to the floor of the driveway.

As the building settles, after an elevator has been installed, the beams 18 constituting the support for the second floor 19 are apt to sag, and consequently it is necessary to provide some suitable means for raising the elevator to keep it in the proper position relative to the floor of the driveway, and for this purpose I support the upper section 10, and consequently the lower section 12, from the bars 20, which are placed on the beams 18 on either side of the section 10. On these bars 20, I place the hook members 21, which, as best seen in Figs. 1 and 2, have the horizontal top portions resting on the tops of the bars 20, and the lower horizontal portions 22 connected with the top portions by the web 23. Suitable studs 24 are supplied on either side of the section 10, preferably by extending a rod 25 through the section and through the tops of the hinge straps 26. I place on these studs 24, eye-bolts 27, which have their threaded upper ends extended through suitable apertures in the lower horizontal portions 22 of the hook members 21, so that by adjusting the nuts 28 on the ends of the eye bolts 27, the elevator-frame can be raised as much as may be necessary to take care of the sagging of the beams 18.

The lower portion 12 of the conveyer-frame is preferably counterbalanced by some such mechanism, and being thus counterbalanced so that it can be swung up without any difficulty, it becomes necessary to lock said section in its operative position, for which purpose I employ the previously mentioned locking levers 16. These levers preferably take the form of foot levers having treadles 29 at their outer ends and having their inner ends pivoted to the bottom of the section 12 at 30. Each lever 16 is formed with a cam surface 31, which rides over the lug 17 and automatically raises the lever into locking position, so that when the shoulder 15 is passed, the lever can fall or be pressed into locking position. To retain the lever 16 in locked position, I pivot thereto the ratchet-bar 32, which has upwardly-directed ratchet-teeth 33 adapted to coöperate with one of the noses of the gravity dog 34 pivoted to the framework 12, preferably in connection with the guide piece 35 through which the ratchet-bar extends. Above the ratchet teeth 33, I form the shoulder 36, and with this construction, it will be observed that when the foot lever is pressed down into locking position, it will be held by the engagement of one of the points of the dog 34 with the ratchet teeth 33. When it is desired to release the frame and swing it up into the dotted-line position shown in Fig. 1, the position of the dog 34 is reversed to the dotted-line position shown in Fig. 3, and the foot lever 39 is lifted up until the other point of the dog 34 engages the shoulder 36 to hold the locking lever in the disengaged position shown in dotted lines in Fig. 3.

In these elevators, a series of cups 37 are suspended between the pairs of sprocket chains 38, which chains coöperate with sprocket wheels 39 secured on the shaft 40 journaled in the bottom of the lower section 12. The chains 38 are driven by any suitable power, so that in operation the cups are carried up continuously to lift the grain to the top of the elevator. The trough or casing 12 has in the lower side thereof, adjacent the hopper 14, the opening 41 formed by omitting a portion of the wall, and the bottom of the casing takes the form of a boot 42, preferably formed by the sheet-metal cut and bent into the shape shown. The end 43 of said sheet-metal is utilized to form the fixed member of a hinge 44, the other member 45 of which is bolted to the board 46 forming the support for the lower end of the hopper 14. This board 46 has bolted thereto the two side pieces 47, which are generally triangular in their outline, and form the bottom of the hopper except so far as the same is formed by the reciprocating feeding-member 48. The upper surface of this reciprocating feeding-member 48 is provided with ratchet bars 49, the teeth of which face downwardly, and it is adapted to reciprocate on bearings formed by the upper surface of the bar 46 and the opposed plates 50, as seen in Fig. 8, and held in place by the bolts 51, while the bearing at the upper end is formed by the opposed plates 52 and 50 secured at the top and bottom of the edges of the pieces 47 by bolts 54. The bottom of the hopper is strengthened at the outer end by the cross pieces 55 and 56 extending across said end and suitably secured to the pieces 47. The sides 57 of the hopper may be formed of sheet-metal, or in any manner desired, and they are designed to hold the material on the bottom and direct it into the boot 42.

To reciprocate this feeding member 48, I mount loosely on the outer end of the shaft 40, which is rotated by the conveying mechanism, the sprocket wheel 58, and I spline on the outer end of this shaft 40 the clutch sleeve 59, which is moved by the clutch lever 60, fulcrumed to the wall of the section at 61, into and out of engagement with the clutch member 62 formed on the hub of the sprocket wheel 58. A sprocket chain 63 connects this sprocket wheel 58 with a sprocket wheel 64 secured on the outer end of the shaft 65 journaled in bearings 66 formed on the bracket 67 secured to the under side of the portion 43 of the boot. A crank arm 67ᵃ carries the crank pin 68, which is connected by the pitman rod 69 with the pivot bolt 70 mounted in the bearing bracket 71 secured to the bar 72 bolted to the under side of the reciprocating feed-member 48. With the construction thus described, it will be readily apparent that when the clutch lever 60 is shifted to throw the reciprocating feeding-mechanism into operation, the latter will be reciprocated and the teeth 49 will force the grain down into the boot so that it will be positively forced into the cups 37, to be carried up thereby to the top of the elevator.

The locking levers 16, in addition to holding the lower section 12 in its vertical position, also, as the result of the coaction of the dogs 34 and the teeth 33 on the bars 32, serve to support a part of the weight of the section 12 by reacting on the floor of the driveway, thereby wedging the lower section between the floor and the top section, and this action prevents any swinging chattering, which would otherwise result from the action thereon of the reciprocating feeding-mechanism.

While I have herein shown and described my novel locking means to hold the swinging trough section in place and my novel means for adjustably suspending the conveyer trough in place, I do not herein claim the same, as these features are covered by my Patents Nos. 1,169,535, dated January 25, 1916, and 1,228,205, dated May 27, 1917; issued on divisional applications; and I do not herein claim the feed mechanism for the hopper apart from the locking mechanism, as that is claimed in my divisional application No. 177,778, filed June 29, 1917.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In an elevator, the combination with a support, of a depending frame pivoted thereto at its upper end, a reciprocating feeding-mechanism associated therewith and tending to swing the lower end of the frame, and locking mechanism acting to thrust said frame up against the support and prevent its swinging.

2. In an elevator, the combination with a support, of a depending frame pivoted thereto at its upper end, a reciprocating feeding-mechanism associated therewith and tending to swing the lower end of the frame, and locking mechanism acting to thrust said frame up against the support and prevent its swinging, said mechanism consisting of a locking lever pivoted to the frame and having a bearing against a fixed surface beneath the frame, and a detent to hold said lever pressing down against said surface.

3. In an elevator, the combination with a support, of a depending frame pivoted thereto at its upper end, a reciprocating feeding-mechanism associated therewith and tending to swing the lower end of the frame, and locking mechanism acting to thrust said frame up against the support and prevent its swinging, said mechanism consisting of a locking lever pivoted to the frame and having a bearing against a fixed surface beneath the frame, a ratchet bar pivoted to the lever, and a dog pivoted to the frame and coöperating with the teeth of the bar to hold said lever pressing down against said surface.

4. In an elevator, the combination with a support, of a depending frame pivoted thereto at its upper end, a reciprocating feeding-mechanism associated therewith and tending to swing the lower end of the frame, and locking mechanism acting to thrust said frame up against the support and prevent its swinging, said mechanism consisting of a locking lever pivoted to the frame and having a bearing against a fixed surface beneath the frame, a ratchet bar pivoted to the lever, a dog pivoted to the frame and coöperating with the teeth of the bar to hold said lever pressing down against said surface, and a guide for the ratchet bar carried by the frame.

In witness whereof, I have hereunto set my hand and affixed my seal, this 12th day of December, A. D. 1914.

JOHN H. GILMAN. [L. S.]

Witnesses:
AUGUST LEDRICH,
ED. R. CLAUS.

Copies of this patent may be obtained for five cents each, by addressing the "Commissioner of Patents, Washington, D. C."